United States Patent [19]

Sobel et al.

[11] Patent Number: 4,823,621
[45] Date of Patent: Apr. 25, 1989

[54] MAGETOELASTIC FORCE TRANSDUCER

[75] Inventors: Jarl Sobel; Lars Örnholmer, both of Västerås, Sweden

[73] Assignee: Asea Brown Boveri AB, Västerås, Sweden

[21] Appl. No.: 188,204

[22] Filed: Apr. 29, 1988

[30] Foreign Application Priority Data

Apr. 30, 1987 [SE] Sweden .............................. 8701806

[51] Int. Cl.⁴ .................................................. G01L 1/12
[52] U.S. Cl. .............................. 73/862.69; 73/DIG. 2
[58] Field of Search ...................... 73/862.69, DIG. 2; 335/215

[56] References Cited

U.S. PATENT DOCUMENTS 1,906,551  5/1933  DeForrest ...................... 73/DIG. 2
3,197,722  7/1965  Chauss ........................... 73/DIG. 2
4,192,394  3/1980  Simpson ................................ 177/45

FOREIGN PATENT DOCUMENTS 0089916  2/1987  European Pat. Off. .
151267   8/1955  Sweden .

Primary Examiner—Charles A. Ruehl
Assistant Examiner—Hollis T. Chen
Attorney, Agent, or Firm—Watson Cole Grindle & Watson

[57] ABSTRACT

A magnetoelastic force transducer comprising two identical, cylindrical bodies defining a hollow magnetic core and held together by means of a force-transmitting stud bolt has its measuring and excitation windings located in the core. The interior of the core is constructed such that a thin cylindrical tubular wall is formed opposite to a respective measuring winding in each one of the bodies, whereby when the core is force-loaded via the stud bolt a compressive stress arises in one of these tubular walls and a tensile stress arises in the other. To eliminate a possible measurement signal at zero applied force a magnetically asymmetric center pole in the form of a punched disk of a soft-magnetic material and having the same diameter as the core and having a foil of a similar material secured on one side is located between the bodies. The hickness of the foil determines the magnitude of the signal adjustment.

10 Claims, 1 Drawing Sheet

MAGETOELASTIC FORCE TRANSDUCER

TECHNICAL FIELD

The present invention relates to a magnetoelastic transducer for force measurement. Characteristic of a transducer according to the invention is that it has a high sensitivity and that it is provided with an improved means for neutral point compensation. Magnetoelastic transducers in general are widely used within engineering and other industries where there is a need for force measurement.

DISCUSSION OF PRIOR ART

Magnetoelastic force transducers are previously known, for example from Swedish Patent No. 151 267. Such a transducer comprises a force-subjected magnetic core built up of magnetoelastic sheets, which is provided with four through-holes for two electrical windings arranged perpendicular to each other, one of these windings being an excitation winding supplied from an a.c. source for generating a magnetic flux in the core, the other winding being a measuring winding for sensing the magnitude of the magnetic flux passing through the measuring winding. The magnitude of this flux is dependent on the magnitude of the external force applied to the core.

Transducers of the above kind often suffer from linearity and "zero-voltage" problems. The linearity can be improved by constructing the transducer with two measuring portions, for example in accordance with the construction described in U.S. Pat. No. 4,192,394, one of these measuring portions being substantially subjected to tensile stress and the other being subjected to compressive stress, both stresses being proportional to the external force. A good linearity can then be achieved by summing the signals derived from the respective measuring portions.

A "zero voltage" of a force transducer is a situation where a finite electrical output signal arises even though there is no input force and is caused by internal stresses and crystal orientation in the sheet material of the core, which have arisen, inter alia, during the manufacturing processes, for example during rolling of the magnetoelastic material.

European Pat. No. 0 089 916 discloses an embodiment of a magnetoelastic transducer having a specially formed sheet section with a measuring portion formed as a doubly-bent beam. This transducer exhibits extremely good linearity and low "zero voltage" values.

In many applications nowadays it is a requirement that the output signal of the transducer should be zero at zero applied force. For reasons of security it is often also required that the residual "zero voltage" must not be electrically compensated for, since in the event of an electricity supply failing, the fact that a zero voltage would no longer be offset may have serious consequences.

In connection with the manufacture of transducers, it is greatly to be desired that they should be simple to manufacture and should not need too high a degree of precision in the manufacture or assembly.

The specification of U.S. patent application Ser. No. 130,545 filed in the name Nordvall on Dec. 9, 1987, describes a magnetoelastic tranducer comprising two identical cylindrical bodies. Extending from one circular end surface of each body, a first axial center hole is provided which has an axial length somewhat shorter than the length of the cylindrical body. A second axial center hole having a diameter smaller than that of the first axial center hole is provided in the remaining central part of each cylindrical body. The latter holes are provided with internal threads.

Extending from the second circular end surface of each cylindrical body is a concentric, annular space which has an axial length somewhat shorter than the length of the body. The inner diameter of the annular space is so adapted that a thin cylindrical tubular wall is formed between this space and the first made center hole.

The two identical, cylindrical bodies are connected together with their second ends confronting in such a way that the annular spaces are facing each other. The connecting together is performed by means of a stud bolt with a shank diameter adapted to provide clearacne in the respective first axial center hole nd with a bolt dimension adapted to match the threads of the smaller, second threaded axial center holes. The shaft of the stud bolt has such a length that it extends somewhat beyond the respective first circular end surface of one of the bodies in the assembled transducer and thus secures the two bodies together.

In the enclosed annular space that is formed when the two cylindrical bodies are connected together, there is located a bobbin, the inner diameter of which is dimensioned to fit against the outer diameter of the thin cylindrical tubular wall and the axial legth of which corresponds to the entire axial length of the enclosed annular space. The bobbin is provided with two measuring windings wound on the bobbin in such a way that each of the measuring windings will be located, in the axial direction, outside the thin cylindrical tubular wall in each of the two assembled cylindrical bodies. The bobbin is also provided with an excitation winding disposed on the outside of the measuring winding and extending over the entire axial length of the bobbin.

From a magnetic point of view, the measuring windings are electrically connected in opposition, which also means that the voltages induced in the windings by any change of flux in the core oppose one another, the total output voltage being approximately zero when the applied force is zero.

By placing the transducer on one first circular end surface against a fixed base and allowing the force which it is desired to measure to be applied to the shank of the stud bolt, a compressive stress is obtained in the thin cylindrical tubular wall which is positioned nearest to the base, and a tensile stress is obtained in the thin cylindrical tubular wall which faces the force-applying side. This influences the magnetoelastic conditions in a known manner for magnetoelastic transducers, and a signal proportional to the applied force can be obtained from the measuring windings.

The transducer can be adapted in a very simple way for measuring tensile forces. This can be accomplished, for example, by providing the stud bolt with a loop, hook or the like.

A magnetoelastic transducer as described above will, with a fair probability, exhibit a certain residual voltage at zero applied force. Because of the design of the transducer core there are several possibilities for a mechanical balancing and compensation of the zero signal. Two different possibilities are clear from the description of U.S. patent application Ser. No. 131,428 filed in the name of Nordvall on the Dec. 10, 1987. One of these comprises giving that bobbin which supports the windings an axial length shorter than the axial length of the annular space. With the aid of adjusting screws in diametriclly and concentrically disposed threaded holes in the circular end surfaces of the transducer, the bobbin can be moved, adjusted and fixed in the axial direction inside the enclosed annular space, so that a possible zero signal can be compensated for, Such an adjustment is generally sufficient.

By providing the first axial hole with threads and by placing, in that hole which faces the fixed base, a coil spring or cup springs, the bias of which can be influenced by an adjusting screw having threads adapted to the threads of the hole, a suitable action of a force on the transducer can be obtained by biasing the spring, which counteracts any residual zero signal. Since the path of force of the spring is much longer than the compression of the transducer when this is subjected to a load, the spring force will be changed only to a negligible extent when the transducer is loaded, that is to say, the transducer is loaded with a substantially constant force from the coil spring.

Although the above two methods of eliminatng "zero voltage" are simple and reliable, there are chances of a settling in of the adjusting screw, an aging of the spring properties due to temperature and great load variations, and so on.

SUMMARY OF THE INVENTION

A device according to the invention for achieving zero compensation comprises placing, between the two cylindrical and identical bodies, a thin magnetically asymmetrical center pole in the form of a punched disk of a soft-magnetic material having the same outer diameter as that of the two cylindrical bodies. The asymmeetry is suitably created by gluing, on one side of the center pole, a considerably thinner soft-magnetic foil, whereby choosing different thickness dimensions for the foil produce differnt degrees of asymmetry and different degrees of offset for the "zero voltage".

Using a symmetrical center pole in the form of only a disk of soft-magnetic material, a symmetrical magnetic field will arise arond an imaginary plane in the center of the disk, parallel to the outer surfaces of the disk. Because of normal field displacement phenomena, caused by eddy currents, the symmetrical magnetic field is greatest at the surfaces of the disk and decreases exponentially inwards towrds the imaginary mid-plane.

By fixing (e.g. gluing) a thin soft-magnetic foil on one side of the disk, the symmetrical field configuration will be changed such that, totally seen, an asymmetry is generated. This is achieved because the foil is thinner than the so-clled magnetic depth of penetration.

Because of the new magnetic flow paths which arise when using a center pole, cylindrical force transducers according to the described design will exhibit a greatly enhanced sensitivity. However, with only one magnetic center pole and without the asymmetry described, which arises as a result of the conducting foil, the zero signal may amount to the same order of magnitude as the sensitivity (volts/turn of measuring winding).

The design with an asymmetrical center pole permits a method of production which is both rational and inexpensive, since the punching or stamping out of the center pole can be carried out after the conducting foil has be glued onto the center pole.

An annular center pole with a simple central hole can only be fitted in place if the bobbin can be split centrally. This can be considered a disadvantage both from the point of view of manufacturing and from the point of view of assembly. However, the invention also comprises an embodiment of transducer in which an undivided bobbin is used. In this case the bobbin is formed with a central waist portion and the center pole is provided with a slot which is adapted to the waist portion. This allows the center pole to be slipped sideways into the central part of the bobbin.

BRIEF DESCRIPTION OF THE DRAWING

The invention will now be further described, by way of example, with reference to the accompanying drawing, in which.

DESCRIPTION OF THE PREFERRED EMBODIMENTS

Figure 1:
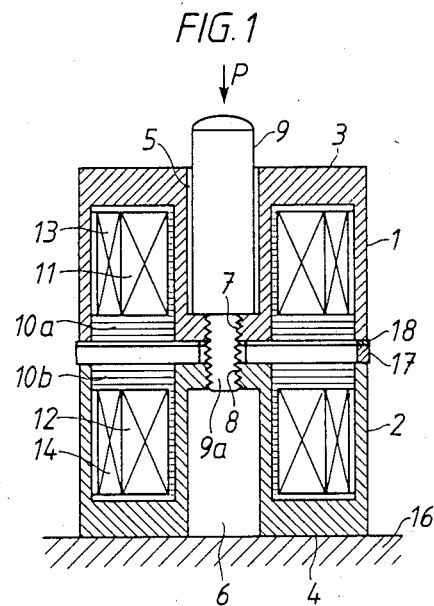
FIG. 1 is a sectional view of a force transducer according to the invention having an asymmetrical center pole.

FIG. 1 shows a magnetoelastic force transducer which for the most part corresponds to the force transducer as described in the specification filed with US Patent Application 130545 previously referred to. It comprises two identical cylindrical bodies 1 and 2. In the two outer outwardly-directed end surfaces 3 and 4 of the bodies 1, 2, first axially extending holes 5 and 6 are provided centrally in the bodies, the axial length of these holes being less than the axial length of the respective body. In the remaining central part of the bodies 1, 2, second threaded holes 7 and 8 are axially provided. The two bodies 1, 2 are held together by a stud bolt 9 which is adapted to provide clearance in the first provided central hole 5, and by a threaded part 9a which screws the bodies 1, 2 together via the threaded holes 7 and 8. A force P applied to the end of the stud bolt 9 is intended to be measured by the transducer as will now be described.

Figure 2:
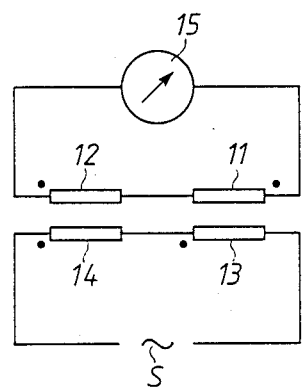
FIG. 2 is a circuit diagram showing how measuring and excitation windings included in the transducer of FIG. 1 are coupled, FIG. 3 diagrammatically illustrates how the magnetic field is distributed in a magnetically symmetrical center pole.

In each of the identical bodies 1, 2, extending from the confronting end surfaces thereof, there is provided an inner axially and concentrically annular space which accommodates a bobbin consisting of two bobbin halves 10a and 10b on which two measuring windings 11 and 12 and two excitation windings 13 and 14 are wound. The separate windings are coupled together according to the arrangement shown in FIG. 2, which shows that the excitation windings 13, 14 are series-connected and the measuring windings 11, 12 are series-connected in opposition. The windings 13, 14 are ac energized from a source S and a force measurement signal induced in the windings 11, 12 is recorded on an instrument 15. The force transducer rests on a base 16 in the arrangement shown in FIG. 1.

According to this invention, an asymmetrical center pole is arranged between the two cylindrical bodies 1, 2.

The center pole consists of a disk 17 of a soft magnetic sheet material and a thin layer 18 of a magnetically conducting foil secured to (e.g. glued onto) the disk 17. For the sake of clarity, the center pole has been drawn with considerably greater thickness in the drawing that what is needed and is appropriate in practice. The thickness of the disk 17 is in practice typically of the order of magnitude of ¼ mm (250 microns) and the thickness of the foil 18 is typically of the order of magnitude of 100 microns.

Figure 3:
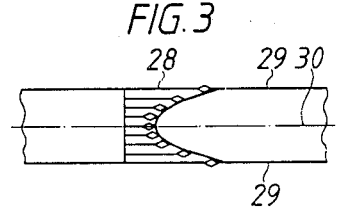

FIG. 3 shows how the magnitude of the field 28 decreases symmetrically inwards from each outer surface 29 of a uniform disk. This gives a center pole which provides a symmetrical field configuration around an imaginary center plane 30.

Figure 4:
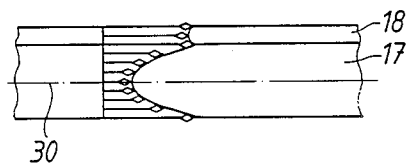
FIG. 4 shows the field configuration arising in a magnetically asymmetrical center pole.

FIG. 4 shows the asymmetrical magnetic field configuration which arises when a thin foil 18 of a soft magnetic material is glued onto one side of the disk 17. The field strengths now vary asymmetrically on each side of the plane 30.

The asymmetrical disk can be inserted in the core either way up and the degree of asymmetry can be different in different disks (e.g. by varying the ratio of the thicknesses of the disk 17 and foil 18), so that an appropriate choice of disk inserted between the bodies the correct way round will fully compensate for any degree of "zero voltage".

In one embodiment of the invention, the center pole according to FIG. 1 consists of an annular disk with one center hole to receive the waist portion of the confronting narrow ends of the bodies 1 and 2 which accommodate the continuous threaded part 9a of the stud bolt. This means that the bobbin has to be separated into an upper and a lower bobbin half in order to locate the disk 17 in place. From a purely technical point of view this does not involve any major problems and drawbacks but from a purely practical point of view, however, it involves more parts and a somewhat complex assembly.

Figure 5:
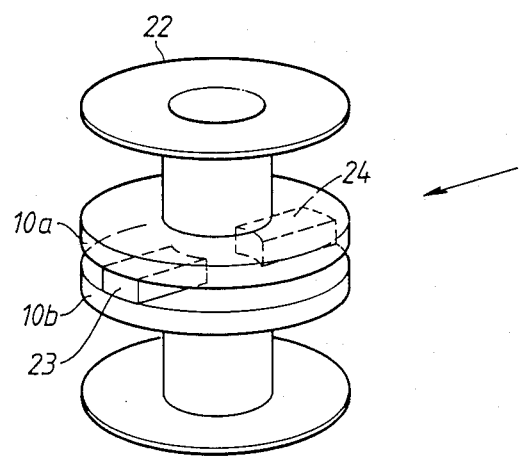
FIG. 5 shows how a bobbin for a force transducer according to a preferred embodiment of the invention is constructed.
Figure 6:
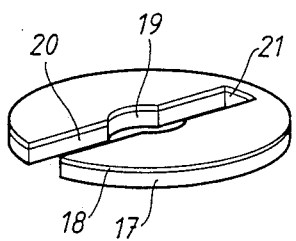
FIG. 6 shows a center pole intended for use with the preferred embodiment of the bobbin shown in FIG. 5.

In a preferred embodiment, therefore, a bobbin as shown in FIG. 5 would be used with a centerpole as shown in FIG. 6. As discussed previously the center pole consists of a circular disk 17 with a glued-on foil layer 18 and it has an outer diameter corresponding to the outer diameter of the identical, cylindrical bodies 1 and 2. The disk 17 is provided with a center hole 19 to provide clearance around the threaded part 9a of the stud bolt 9 and its surrounding waist portion of the bodies 1 and 2. In addition, the center pole in this embodiment is provided with a diametrical slot 20 which almost divides it into two equal halves, but which are held together by a narrow peripheral part 21 of the center pole which provides the end of the slot 20, the dimension of this part 21 corresponding to the thickness of the outer cylindrical tubular wall of each of the bodies 1, 2.

The bobbin 22 shown in FIG. 5 is, in external appearance formed as the bobbin in the previously referred to U.S. patent application Ser. No. 130,545. Thus, a whole bobbin, comprising the two bobbin halves 10a and 10b in FIG. 1, is the starting-point. In the central part of the bobbin, an amount of material corresponding to the center pole shown in FIG. 6 is removed (e.g. milled out or sawn away). This means that between the two bobbin halves there will be bridge portions 23, 24 keeping these halves together. These bridge portions are aligned on a diameter of the bobbin 22, have a rectangulr cross-section with a height in the axial direction of the bobbin which is equal to the thickness of the center pole and have a width equal to the width of the slot 20.

A force transducer according to the invention with a center pole may, of course, be supplemented with the mechanical neutral point adjustments previously mentioned. By making the bobbin somewhat shorter than the inner tubular space and providing the end surfaces of either or both bodies 1, 2 with threaded holes for adjusting screws, the bobbn can be moved, adjusted and fixed in the axial direction inside the bodies 1, 2 so that any residual zero voltage produced by the transducer can be compensated for.

A residual zero voltage after a center pole adjustment canfinally be zero adjusted by suitable biasing of a spring in a first axial hole, provided with threads and an adjusting screw, in that one of the identical, cylindrical bodies (i.e. 2 as shown in FIG. 1) which faces the base 16.

Various modifications can be made to the illustrated arrangement and all such modifications falling within the scope of the following claims represent aspects of this invention.

What is claimed is:

1. A magnetoelastic force transducer comprising a closed core of a solid magnetoelastic material provided with two excitation windings adapted to be supplied with alternating current, and two measuring windings adapted to be connected to a measuring device capable of sensing the electricl signal induced therein by the excitation winding s and changes in said induced signal caused by forces applied ot the core;
   the closed core including two centrally and axially connected cylindrical bodies each having
   (a) outwardly-directed end surfaces in which a respective first hole is provided centrally and axially, the axial length of said holes being shorter than the axial length of the respective body;
   (b) respective second threaded holes provided axially in the remaining central part of the body; and
   (c) an axially extending and concentrically located annular space in each said body;
   a force-transmitting member extending with clearance through the first providd hole in one of said bodies and being threadedly engaged in each of said second holes provieed in the bodies by means of a threaded end thereof,
   the measuring and excitation windings being located in the annular spaces provided within the core,
   and between the two bodies a magnetically asymmetrical center pole is arranged provided with a center hole surrounding said threaded end of the force-transmitting member.

2. A froce transducer according to claim 1, in which said center pole consists of a circular disk of soft-magnetic material with a glued-on foil of soft-magnetic material.

3. A force transducer according to claim 1, in which a bobbin is provided in the annular spaces, which bobbin includes two bobbin halves held together by a waist portion, the center pole being provided with a diametrical slot adapted to slide around the waist portion.

4. A froce transducer according to claim 2, in which a bobbin is provided in the annular spaces, which bobbin includes two bobbin halves held together by a waist portion, the center pole being provided with a diametrical slot adapted to slide around the waist portion.

5. A force transducer according to claim 1, in which a bobbin is provided in the annular spaces, which bobbin includes two separate bobbin halves and the center pole consists of an apertured circular disc.

6. A force transducer according to claim 2, in which a bobbin is provided in the annular spaces, which bobbin includes two separate bobbin halves and the center pole consists of an apertured circular disc.

7. A force transducer according to claim 2, in which the ratio of the thickness of the disk to the thickness of the foil is of the order of 2.5:1.

8. A force transducer according to claim 7, in which the foil has a thickness of about 100 microns.

9. A froce transducer comprising a hollow magnetic core, an excitation winding for magnetically exciting the core and a measuring winding for sensing the magentic excitation in a force-loaded part of the core, the core being formed from a first cylindrical cup-shaped core part and an identical second cylindrical cup-shpaed core part, which cylindrical cup-shaped parts when assembled together define an enclosed volume in which the excitation and measuring windings are located to surround said force-loaded part which is defined by conjoined central parts of the two cylindrical cup-shaped parts, a disk of magnetic material is located between the core parts to provide a center pole, which center pole has different magentic properties on the side of the disk facing the first core part and on the side of the disk facing the second core part, whereby the center pole differently influences the magnetic excitation of the conjoined central parts of the two core parts.

10. A force transducer according to claim 9, in which the disk making the center pole has a layer of foil secured thereto to provide the different magnetic properties on the two sides.

* * * * *